(12) United States Patent
Ma

(10) Patent No.: US 10,954,705 B2
(45) Date of Patent: Mar. 23, 2021

(54) GRILL DAMPING HINGE

(71) Applicants: WUXI HUICHANG ADVANCED GRILL CO., LTD., Jiangsu (CN); WUXI M.Y. ADVANCED GRILL CO., LTD., Jiangsu (CN)

(72) Inventor: Yicheng Ma, Jiangsu (CN)

(73) Assignees: WUXI HUICHANG ADVANCED GRILL CO., LTD., Wuxi (CN); WUXI M.Y. ADVANCED GRILL CO., LTD., Wuxi (CN)

( * ) Notice: Subject to any disclaimer, the term of this patent is extended or adjusted under 35 U.S.C. 154(b) by 0 days.

(21) Appl. No.: 16/739,622

(22) Filed: Jan. 10, 2020

(65) Prior Publication Data
US 2021/0054669 A1  Feb. 25, 2021

(51) Int. Cl.
*E05F 1/12* (2006.01)
*E05D 11/10* (2006.01)
*E05F 3/20* (2006.01)
*A47J 37/07* (2006.01)

(52) U.S. Cl.
CPC ....... *E05D 11/1064* (2013.01); *A47J 37/0786* (2013.01); *E05F 3/20* (2013.01); *E05Y 2900/60* (2013.01)

(58) Field of Classification Search
CPC ...... E05D 11/1064; A47J 37/0786; E05F 3/20
See application file for complete search history.

(56) References Cited

U.S. PATENT DOCUMENTS

| | | | | |
|---|---|---|---|---|
| 6,766,563 B2 * | 7/2004 | Lee | ...................... | A23B 7/0425 16/281 |
| 6,928,698 B2 * | 8/2005 | Chen | ........................ | E05D 3/18 16/277 |
| 7,261,100 B2 * | 8/2007 | Bartmann | ............. | F24C 15/023 126/192 |
| 7,406,747 B2 * | 8/2008 | Chol | .................. | H04N 1/00519 16/239 |
| 8,201,304 B2 * | 6/2012 | Steurer | ................. | E05F 1/1261 16/286 |
| 8,495,796 B2 * | 7/2013 | Ohashi | .................. | E05D 11/105 16/334 |
| 8,844,514 B2 * | 9/2014 | Steurer | ............... | E05B 65/0003 126/197 |
| 8,850,660 B2 * | 10/2014 | Kim | ...................... | G03G 15/00 16/296 |
| 8,973,218 B2 * | 3/2015 | Yabukoshi | ............ | E05F 1/1261 16/286 |

(Continued)

Primary Examiner — Jason W San

(57) ABSTRACT

Disclosed is a grill damping hinge comprising a hinge lower cover and a hinge upper cover covering the top of the hinge lower cover. The invention can adopt double-axis double spring pressing design, and the hinge ear can be adjusted back and forth, and can be easily adjusted when the oven body and the oven cover are different in size, to ensure the sealing effect. The upper cover of the invention is lighter during opening and closing, and the opening-and-closing of the oven cover can stay at any angle within 0 to 58°, thereby avoiding the natural falling of the oven cover and having higher safety performance; In the production process of the invention, the cumbersome link of the screws and the nuts in the traditional hinge is avoided, and the manual installation and commissioning cost can be greatly saved.

10 Claims, 3 Drawing Sheets

(56) References Cited

U.S. PATENT DOCUMENTS

| | | | | |
|---|---|---|---|---|
| 8,985,717 | B2* | 3/2015 | Marzorati | A47B 96/00 |
| | | | | 312/319.2 |
| 9,181,737 | B1* | 11/2015 | Kadus | E05C 19/16 |
| 9,500,015 | B2* | 11/2016 | Omann | E05F 1/1058 |
| 9,803,409 | B2* | 10/2017 | Lee | H04N 1/00559 |
| 10,238,002 | B2* | 3/2019 | Lin | G06F 1/1681 |
| 10,458,168 | B2* | 10/2019 | Hammerer | E05D 11/1021 |
| 10,687,664 | B2* | 6/2020 | Chen | A47J 37/0745 |
| 10,704,311 | B1* | 7/2020 | Collene | E05F 1/1261 |
| 10,724,284 | B2* | 7/2020 | Collene | E05F 3/104 |
| 10,754,285 | B2* | 8/2020 | Kondo | G03G 15/605 |
| 10,781,621 | B2* | 9/2020 | Kondo | H04N 1/00554 |
| 10,788,785 | B2* | 9/2020 | Kondo | G03G 15/60 |
| 10,822,851 | B2* | 11/2020 | Graham | E05F 1/1075 |
| 2003/0000955 | A1* | 1/2003 | Lee | E05F 1/1261 |
| | | | | 220/830 |

* cited by examiner

GRILL DAMPING HINGE

CROSS REFERENCE TO RELATED APPLICATIONS

The present application claims the benefit of Chinese Patent Application No. 201910773683.7 filed on Aug. 21, 2019, the contents of which are incorporated herein by reference in their entirety.

TECHNICAL FIELD

The present disclosure relates to the field of oven accessories, and in particular to a grill damping hinge.

BACKGROUND

With the increasing popularity of BBQ, the oven is gradually moving from indoor to outdoor. Therefore, it is necessary to ensure the opening-and-closing function of the upper and lower ovens of the oven. The realization of this opening-and-closing function depends on the spring hinge structure. Existing spring hinges include a fixed housing, a movable housing hinged to the fixed outer housing, a spring, and a number of small positioning accessories. The shortcomings are that: parts of the hinge are too many, with complicated positioning thereof, large parts are assembled with small positioning parts, the processing steps are complicated; the transmission parts are too many, and the transmission efficiency is low. The transmission part is unreasonable. When the movable housing is in a closed stable state relative to the fixed housing (the hinge stops), the spring is always in a compressed state, causing the spring force lost, and the spring force cannot be in an optimal state for a long time with a short life. This results in a higher assembly cost and finished product of the hinge.

SUMMARY

Object: The object of the present disclosure is to provide a grill damping hinge, in order to overcome the deficiencies of the prior art.

Technical Solution: In order to achieve the above object, the present invention is specifically achieved by: a grill damping hinge including a C-shaped hinge lower cover having a cavity and a hinge upper cover covering the top of the hinge lower cover, the hinge upper cover and the hinge lower cover being connected via the opening-and-closing shaft penetrating an overlapping portion of two covers; a top of the hinge lower cover and the overlapping portion of the upper cover are provided with arcuate grooves, and both ends provided with the upper cover shaft are passed through the arcuate grooves and penetrate the upper cover of the hinge, the cover shaft is sleeved with an upper cover shaft pressing rod; two bottom sides of the hinge lower cover that is not overlapping portion of the hinge upper cover are provided with a groove, and the groove is provided with a lower cover fixed shaft inserted in the groove and parallel to the upper cover shaft pressing rod, a spring shaft is fixed between the upper cover shaft pressing rod and the lower cover shaft fixing rod, and the spring shaft is penetratingly provided with a hinge spring; the hinge cover at the position of the hinge lower cover cavity are respectively provided at two sides of hinge upper cover ears integrally formed with the hinge upper cover, the hinge upper cover ear is provided with a plurality of hinge upper cover ear holes; two sides of the hinge lower cover cavity that is not overlapping portion of the hinge upper cover are respectively provided with a hinge lower cover adjusting hole, and provided with the hinge lower cover adjusting ear is fixed on the hinge lower cover through the hinge lower cover adjusting holes, the hinge lower cover adjusting ear is provided with a plurality of the hinge lower cover ear holes; angles are respectively formed between the hinge upper cover ear and the side of the hinge upper cover, and the hinge lower cover adjusting ear and the side of the hinge lower cover.

In addition, two spring shafts are fixed between the upper cover shaft pressing rod and the lower cover shaft fixing rod, and each of the spring shafts is provided with a hinge spring. The strength of the entire oven cover is ensured by two springs.

In addition, the hinge upper cover and the hinge lower cover are connected by an upper cover opening-and-closing shaft penetrating the overlapping portions of the two, and the length of upper cover opening-and-closing shaft is greater than that of the hinge upper cover, the two ends of the upper cover opening-and-closing shaft protrude from the hinge upper cover, and the two ends of the upper cover opening-and-closing shaft protruding from the hinge upper cover are respectively provided with a loop of recesses provided with a spring ring for fixing. The structure can ensure the connection strength and the rotational strength of the hinge upper cover and the upper cover opening-and-closing shaft, and ensure safe use.

In addition, the hinge lower cover adjusting hole is a linear groove, and the hinge lower cover adjusting ear is fixed to the hinge lower cover through the bolt penetrating the hinge lower cover adjusting hole. This design enables the hinge lower cover to be fixed in the groove as needed, adapting to different sizes of oven lower cover.

In addition, the two bottom sides of the hinge lower cover that is not the overlapping portions of the hinge upper cover are respectively provided with two grooves parallel to each other. The fixing strength of the lower cover shaft fixing rod can be improved.

In addition, a bottom of the upper cover shaft pressing rod is provided with a first through hole for one end of the spring shaft; and the lower cover shaft fixing rod comprises a fixing surface inside the cavity, and a hook inserted in the groove, wherein the fixing surface is correspondingly provided with a second through hole for the other end of the spring shaft at the position parallel to the first through hole, the spring shaft has a thread on the top, and the top of the spring shaft is screwed to the first through hole, and the spring shaft is locked and fixed by the fixing screw below the first through hole.

In addition, a joint of the spring shaft and the lower cover shaft fixing rod are provided with a stepped spring guide block, and the hinge spring bottom and the spring guiding block are fixed to and pressed against the lower cover shaft pressing rod.

In addition, a fixing block having a section larger than the spring end surface is provided between the hinge spring and the fixing screw, and the fixing block is inserted on the spring shaft, the spring shaft between the fixing block and the fixing screw is screwed on the adjusting screw having a section smaller than the fixing block.

In addition, the hinge upper cover and the hinge lower cover are connected by an upper cover opening-and-closing shaft penetrating the overlapping portions of the two; an arcuate groove having an arc of not more than 90° is provided on the top of the hinge lower cover and the upper cover overlapping portion, and both ends of the upper cover shaft pass through the arcuate groove and the hinge upper cover, and when the hinge upper cover is open or closed, a corner of no more than 58° is formed between the top cover surface of the hinge upper cover and the hinge lower cover.

In addition, the upper cover ear holes and the lower cover ear holes are hardy holes, which is easy for installing and docking.

The specific working principle of the invention is as follows: the hinge upper cover is fixed with the oven upper cover, the hinge lower cover is fixed with the oven lower cover (the hinge upper cover is bolted with the oven upper cover by the hinge upper cover ear, the hinge lower cover is bolted with the oven lower cover by the hinge lower cover ear), a pair of parallel upper and lower cover shaft fixing rods are designed to clamp the spring shaft in the cavity of the hinge lower cover, and the hinge spring provided on the spring shaft can carry the weight of the oven upper cover (ie. the hinge upper cover), which is extremely convenient. At the same time, the height of the hinge spring is set by adjusting the screw, the upper cover is controlled to flip within a certain range.

Advantageous Effects: Compared with the traditional technique, the present invention has the following advantages:

(1) The invention can adopt double-axis double spring pressing design, and the hinge ear can be adjusted back and forth, and can be easily adjusted when the oven body and the oven cover are different in size, to ensure the sealing effect;

(2) The upper cover of the invention is lighter during opening and closing, and the opening-and-closing of the oven cover can stay at any angle within 0 to 58°, thereby avoiding the natural falling of the oven cover and having higher safety performance;

(3) The invention has beautiful appearance, high temperature resistance and convenient assembly;

(4) In the production process of the invention, the cumbersome link of the screws and nuts in the traditional hinge is avoided, and the cost of manual installation and commissioning can be greatly saved.

DETAILED DESCRIPTION OF EMBODIMENTS

Embodiment 1

Figure 1:
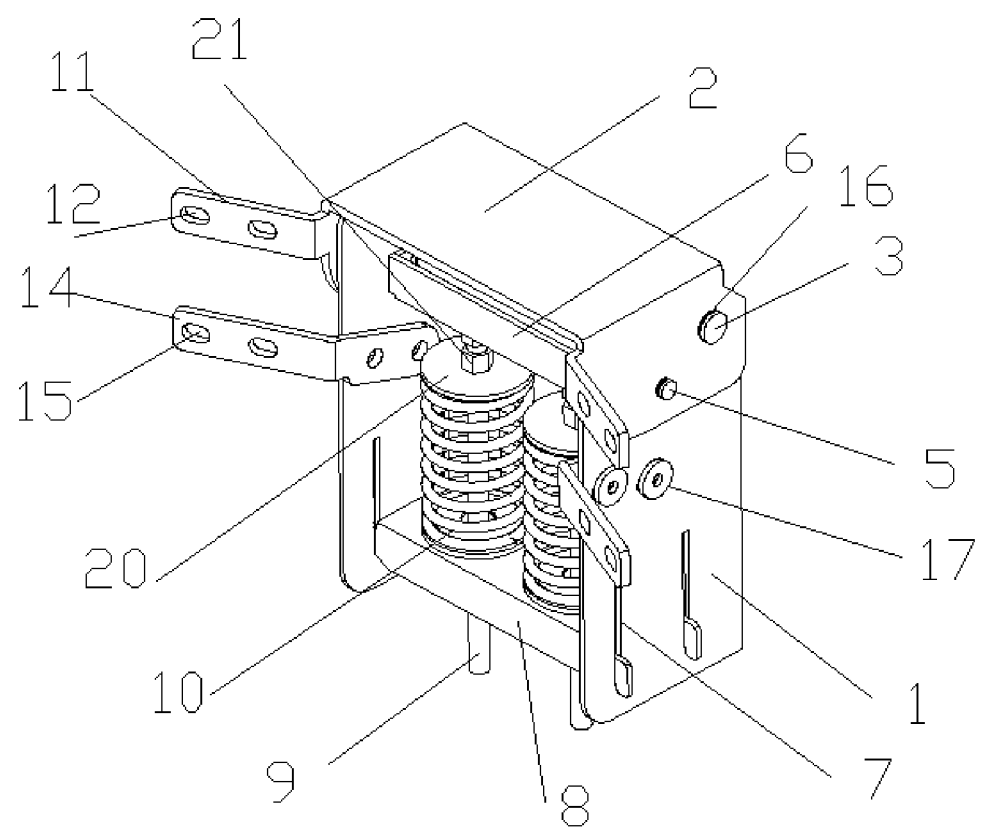
FIG. 1 is a schematic view of the structure of the present invention.
Figure 2:
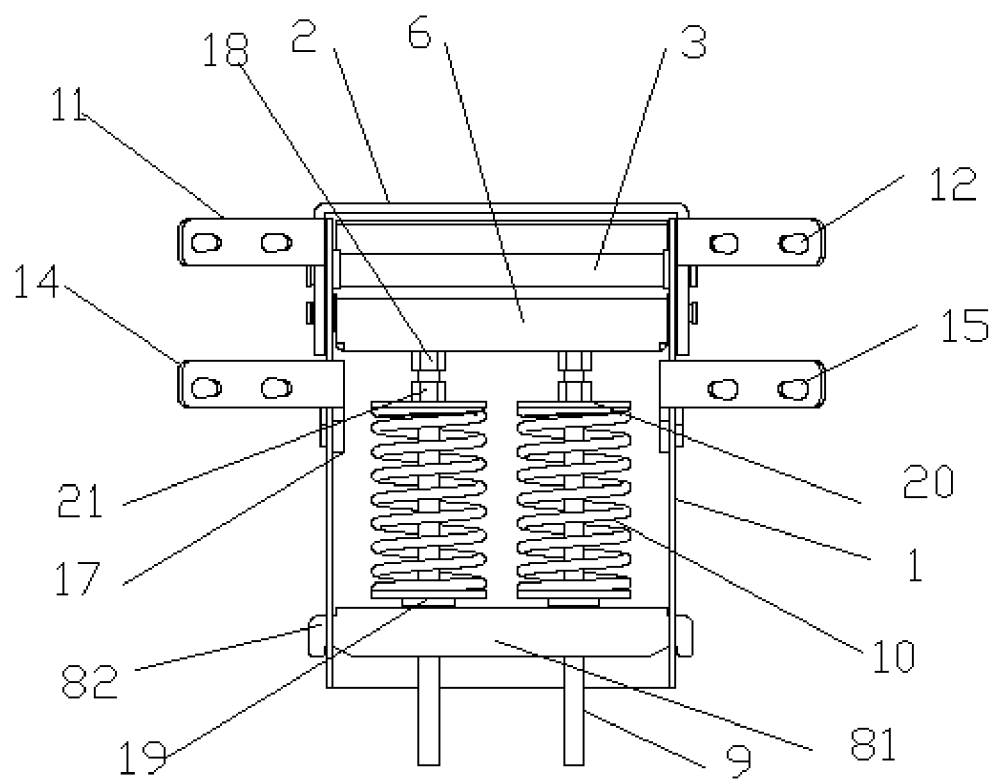
FIG. 2 is a side view of the present invention.
Figure 3:
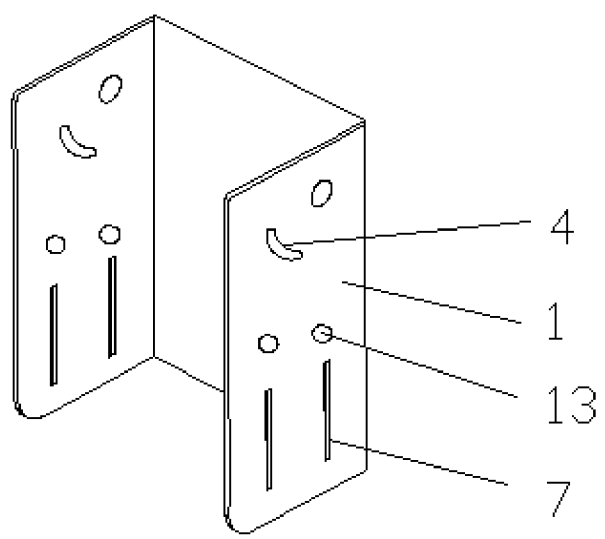
FIG. 3 is a schematic view showing the structure of the hinge lower cover of the present invention.

The grill damping hinge shown in FIGS. 1 to 3 includes a C-shaped hinge lower cover 1 having a cavity and a hinge upper cover 2 covering the top of the hinge lower cover, the hinge upper cover 2 and the hinge lower cover 1 are connected via the opening-and-closing shaft 3 penetrating an overlapping portion of two covers. The top of the hinge lower cover 1 and the overlapping portion of the upper cover 2 are provided with arcuate grooves 4, and both ends provided with the upper cover shaft 5 are passed through the arcuate grooves 4 and penetrate the hinge upper cover 2, the upper cover shaft 5 is sleeved with an upper cover shaft pressing rod 6; two bottom sides of the hinge lower cover 1, which are not the overlapping portion of the hinge upper cover 1, are provided with a groove 7, and the groove 7 is provided with a lower cover fixed shaft 8 inserted in the groove 7 and parallel to the upper cover shaft pressing rod 6, a spring shaft 9 is fixed between the upper cover shaft pressing rod 6 and the lower cover shaft fixing rod 8, and the spring shaft 9 is penetratingly provided with a hinge spring 10; the hinge upper cover 2 at the position of the hinge lower cover cavity are respectively provided at two sides of hinge upper cover ears 11 integrally formed with the hinge upper cover 2, the hinge upper cover ear 11 is provided with a plurality of hinge upper cover ear holes 12, and the hinge upper cover ear holes 12 are hardy holes; two sides of the cavity of the hinge lower cover 2, which are not the overlapping portion of the hinge upper cover, are respectively provided with a hinge lower cover adjusting hole 13, and provided with the hinge lower cover adjusting ear 14 is fixed on the hinge lower cover 1 through the hinge lower cover adjusting holes 13, the hinge lower cover adjusting ear 14 is provided with a plurality of hinge lower cover ear holes 15, and the hinge lower cover ear holes 15 are hardy holes; angles are respectively formed between the hinge upper cover ear 11 and the side of the hinge upper cover 2, and the hinge lower cover adjusting ear 14 and the side of the hinge lower cover 1.

Embodiment 2

Referring to Embodiment 1, in a preferred embodiment, two spring shafts 9 are fixed between the upper cover shaft pressing rod 6 and the lower cover shaft fixing rod 8, and the spring shaft 9 is provided with the hinge spring 10.

Embodiment 3

Referring to Embodiment 1, a preferred movable structure of the hinge upper cover and the hinge lower cover is described. The hinge upper cover 2 and the hinge lower cover 1 are connected by an upper cover opening-and-closing shaft 3 penetrating the overlapping portions of the both. The length of the upper cover opening-and-closing shaft 3 is greater than the length of the hinge upper cover 2, and both ends of the upper cover opening-and-closing shaft 3 protrude from the hinge upper cover 2, and the two ends of the upper cover opening-and-closing shaft 3, which protrude from the hinge upper cover 2, are respectively provided with a loop of recesses 16 provided with a spring ring for fixing. Further, an arcuate groove 4 having an arc of not more than 90° is provided on the top of the hinge lower cover 1 and the upper cover 2 overlapping portion, and both ends of the upper cover shaft 5 pass through the arcuate groove 4 and penetrate the hinge upper cover 2. When the hinge upper cover 2 is open or closed, a corner of no more than 58° is formed between the top cover surface of the hinge upper cover 2 and the hinge lower cover 1. Both ends of the upper cover shaft can also adopt the same design of the upper cover opening-and-closing shaft.

Embodiment 4

Reference Embodiment 1, a preferred structure of the hinge lower cover adjusting hole is described. The hinge lower cover adjusting hole 13 is a linear groove, and the hinge lower cover adjusting ear 14 penetrates the hinge lower cover adjusting hole 13 through the bolt 17, and then fixed on the hinge lower cover 1.

Embodiment 5

Referring to Embodiment 1, the two bottom sides of the hinge lower cover 1, which are not the overlapping portions of the hinge upper cover, are respectively provided with two grooves 7 parallel to each other.

Embodiment 6

Referring to Embodiment 1, a preferred structure of the upper cover shaft pressing rod and the lower cover shaft pressing rod are provided. The bottom of the upper cover shaft pressing rod 6 is provided with a first through hole for one end of the spring shaft 9 to penetrate. The lower cover shaft fixing rod 8 includes a fixing surface 81 inside the cavity, and a hook 82 inserted in the groove 7. The fixing surface 81 is correspondingly provided with a second through hole for the other end of the spring shaft 9 for penetrating at the position parallel to the first through hole. The spring shaft 9 has a thread on the top, and the top of the spring shaft 9 is screwed to the first through hole, and the spring shaft 9 is locked and fixed by the fixing screw 18 below the first through hole. On the one hand, this design improves the lower cover shaft fixing rod, on the other hand, it facilitates the assembly of the entire hinge. The bottom of the spring shaft realizes the crimping with the lower cover shaft fixing rod, and the lower cover shaft fixing rod is inserted into the groove through the hooks on both sides. It is very convenient to assemble or disassemble.

Embodiment 7

Referring to Embodiment 1, the spring shaft 9 and the lower cover shaft fixing rod 8 are connected with a stepped spring guide block 19 at their joint, and the hinge spring 10 bottom is fixed to the spring guide block 19 and pressed against the lower cover shaft fixing rod 8.

Embodiment 8

Referring to Embodiment 1, a preferred structure of the hinge spring is described, a fixing block 20 having a section larger than the spring end surface is provided between the hinge spring 10 and the fixing screw 18, and the fixing block 20 is inserted on the spring shaft 9, the spring shaft 9 between the fixing block 20 and the fixing screw 18 is screwed on the adjusting screw 21 having a section smaller than the fixing block 20.

What is claimed is:

1. A grill damping hinge comprising a C-shaped hinge lower cover having a cavity and a hinge upper cover covering the top of the hinge lower cover, the hinge upper cover and the hinge lower cover being connected via an opening-and-closing shaft penetrating an overlapping portion of two covers; wherein: a top of the hinge lower cover and the overlapping portion of the upper cover are provided with arcuate grooves, and both ends provided with an upper cover shaft are passed through the arcuate grooves and penetrate the hinge upper cover, the upper cover shaft is sleeved with an upper cover shaft pressing rod; two bottom sides of the hinge lower cover, which are not the overlapping portion of the hinge upper cover, are provided with a groove provided with a lower cover fixed shaft inserted in the groove and parallel to the upper cover shaft pressing rod, a spring shaft is fixed between the upper cover shaft pressing rod and the lower cover shaft fixing rod, and the spring shaft is penetratingly provided with a hinge spring; the hinge upper cover at the position of the hinge lower cover cavity are respectively provided at two sides of hinge upper cover ears integrally formed with the hinge upper cover, the hinge upper cover ear is provided with a plurality of hinge upper cover ear holes; two sides of the cavity of the hinge lower cover, which are not the overlapping portion of the hinge upper cover, are respectively provided with a hinge lower cover adjusting hole, and provided with the hinge lower cover adjusting ear is fixed on the hinge lower cover through the hinge lower cover adjusting holes, the hinge lower cover adjusting ear is provided with a plurality of hinge lower cover ear holes; angles are respectively formed between the hinge upper cover ear and the side of the hinge upper cover, and the hinge lower cover adjusting ear and the side of the hinge lower cover.

2. The grill damping hinge according to claim 1, wherein two spring shafts are fixed between the upper cover shaft pressing rod and the lower cover shaft fixing rod, and each of the spring shafts is provided with the hinge spring.

3. The grill damping hinge according to claim 1, wherein the hinge upper cover and the hinge lower cover are connected by an upper cover opening-and-closing shaft penetrating the overlapping portions of the two, and the length of upper cover opening-and-closing shaft is greater than that of the hinge upper cover, the two ends of the upper cover opening-and-closing shaft protrude from the hinge upper cover, and the two ends of the upper cover opening-and-closing shaft, which protrude from the hinge upper cover, are respectively provided with a loop of recesses provided with a spring ring for fixing.

4. The grill damping hinge according to claim 1, wherein the hinge lower cover adjusting hole is a linear groove, and the hinge lower cover adjusting ear is fixed to the hinge lower cover through the bolt penetrating the hinge lower cover adjusting hole.

5. The grill damping hinge according to claim 1, wherein the two bottom sides of the hinge lower cover, which are not the overlapping portions of the hinge upper cover, are respectively provided with two grooves parallel to each other.

6. The grill damping hinge according to claim 1, wherein a bottom of the upper cover shaft pressing rod is provided with a first through hole for one end of the spring shaft to penetrate; and the lower cover shaft fixing rod comprises a fixing surface inside the cavity, and a hook inserted in the groove, wherein the fixing surface is correspondingly provided with a second through hole for the other end of the spring shaft to penetrate at the position parallel to the first through hole, the spring shaft has a thread on the top, and the top of the spring shaft is screwed to the first through hole, and the spring shaft is locked and fixed by the fixing screw below the first through hole.

7. The grill damping hinge according to claim 6, wherein a joint of the spring shaft and the lower cover shaft fixing rod is provided with a stepped spring guide block, and the hinge spring bottom and the spring guiding block are fixed to and pressed against the lower cover shaft pressing rod.

8. The grill damping hinge according to claim 6, wherein a fixing block having a section larger than the spring end surface is provided between the hinge spring and the fixing screw, and the fixing block is inserted on the spring shaft, the spring shaft between the fixing block and the fixing screw is screwed on the adjusting screw having a section smaller than the fixing block.

9. The grill damping hinge according to claim 1, wherein the hinge upper cover and the hinge lower cover are connected by an upper cover opening-and-closing shaft penetrating the overlapping portions of the two; an arcuate groove having an arc of not more than 90° is provided on the top of the hinge lower cover and the upper cover overlapping portion, and both ends of the upper cover shaft pass through the arcuate groove and penetrate the hinge upper cover, and when the hinge upper cover is open or closed, a corner of no more than 58° is formed between the top cover surface of the hinge upper cover and the hinge lower cover.

10. The grill damping hinge of claim 1, wherein the upper cover ear holes and the lower cover ear holes are hardy holes.

* * * * *